United States Patent
Eitland et al.

(10) Patent No.: US 11,435,027 B2
(45) Date of Patent: Sep. 6, 2022

(54) LUBRICATION DEVICE, LUBRICATION SYSTEM AND METHOD FOR APPLICATION OF A LUBRICANT TO THE INTERNAL THREADS OF A PIPE BODY

(71) Applicant: Farsund drilling solution AS, Farsund (NO)

(72) Inventors: Erik Eitland, Farsund (NO); Arne Marthinsen, Farsund (NO)

(73) Assignee: Farsund drilling solution AS, Farsund (NO)

( * ) Notice: Subject to any disclaimer, the term of this patent is extended or adjusted under 35 U.S.C. 154(b) by 260 days.

(21) Appl. No.: 16/612,690

(22) PCT Filed: May 15, 2018

(86) PCT No.: PCT/NO2018/050127
§ 371 (c)(1),
(2) Date: Nov. 11, 2019

(87) PCT Pub. No.: WO2018/212664
PCT Pub. Date: Nov. 22, 2018

(65) Prior Publication Data
US 2020/0208775 A1 Jul. 2, 2020

(30) Foreign Application Priority Data
May 16, 2017 (NO) .................................. 20170804

(51) Int. Cl.
*F16N 7/00* (2006.01)
*E21B 19/00* (2006.01)
*F16N 25/04* (2006.01)
*B05D 7/22* (2006.01)
*B08B 9/02* (2006.01)

(52) U.S. Cl.
CPC ................. *F16N 7/00* (2013.01); *B05D 7/22* (2013.01); *B08B 9/021* (2013.01); *E21B 19/00* (2013.01); *F16N 25/04* (2013.01); *F16N 2210/00* (2013.01)

(58) Field of Classification Search
CPC ........ F16N 7/00; F16N 25/04; F16N 2210/00; B05D 7/22; B08B 9/021; E21B 19/00
(Continued)

(56) References Cited

U.S. PATENT DOCUMENTS 2,760,585 A * 8/1956 Bergeron ............... E21B 17/006
166/243
3,436,783 A * 4/1969 McCartney ............. B08B 9/021
15/104.03
(Continued)

FOREIGN PATENT DOCUMENTS

WO 9525216 9/1995
WO WO-9525216 A1 * 9/1995 ........... E21B 17/006
(Continued)

OTHER PUBLICATIONS

Norwegian Search Report for 20170804 dated Dec. 16, 2017.
International Search Report and the Written Opinion for 050127 dated Jul. 24, 2018.

*Primary Examiner* — Gene O Crawford
*Assistant Examiner* — Emily Rose Kincaid
(74) *Attorney, Agent, or Firm* — Andrus Intellectual Property Law, LLP

(57) ABSTRACT

A lubrication device, a lubrication system and a method are for applying a lubricant from a lubricating-fluid reservoir to an internal threaded portion of a pipe body. The lubrication device includes: a rotary device having: first and second coupling parts, and fluid passage for carrying the lubricant from the first coupling part to the second coupling part. The first and the second coupling parts are arranged to rotate
(Continued)

relative to each other around an axis that coincides in the main with the longitudinal axis of the pipe body. An applicator body is connected to the second coupling part to allow rotation around the rotational axis of the rotary device. The applicator body has a fluid passage with an outlet for carrying the fluid to the applicator surface as the fluid passage in the applicator body is in fluid communication with a corresponding fluid passage in the rotary device.

17 Claims, 5 Drawing Sheets

(58) Field of Classification Search
USPC ............................................................ 184/14
See application file for complete search history.

(56) References Cited

U.S. PATENT DOCUMENTS

| | | | |
|---|---|---|---|
| 4,199,858 A * | 4/1980 | Meijs | E21B 17/006 166/243 |
| 4,403,363 A | 9/1983 | Hess | |
| 5,404,965 A * | 4/1995 | McCormick | F16N 21/00 118/317 |
| 5,857,476 A | 1/1999 | Bee et al. | |
| 2004/0049905 A1 | 3/2004 | Jansch et al. | |
| 2004/0140159 A1 | 7/2004 | Belik | |
| 2007/0029140 A1* | 2/2007 | Smigelski | F16N 25/02 184/81 |
| 2013/0027715 A1 | 10/2013 | Belik et al. | |
| 2013/0340794 A1 | 12/2013 | Flynn | |
| 2014/0110173 A1 | 4/2014 | Belik et al. | |
| 2016/0047180 A1* | 2/2016 | Belik | E21B 19/24 166/77.52 |
| 2016/0059279 A1* | 3/2016 | Belik | B08B 9/021 134/169 C |
| 2016/0167093 A1 | 6/2016 | Cook | |

FOREIGN PATENT DOCUMENTS

| | | |
|---|---|---|
| WO | 2007037698 | 4/2007 |
| WO | 2014/165630 | 10/2014 |
| WO | 2015041831 | 3/2015 |

* cited by examiner

LUBRICATION DEVICE, LUBRICATION SYSTEM AND METHOD FOR APPLICATION OF A LUBRICANT TO THE INTERNAL THREADS OF A PIPE BODY

CROSS-REFERENCE TO RELATED APPLICATIONS

This application is the U.S. national stage application of International Application PCT/NO2018/050127, filed May 15, 2018, which international application was published on Nov. 22, 2018, as International Publication WO 2018/212664 in the English language. The International Application claims priority of Norwegian Patent Application No. 20170804, filed May 16, 2017. The international application and Norwegian application are both incorporated herein by reference, in entirety.

FIELD

The invention relates to a lubrication device, a lubrication system and a method for the application of a lubricant to an internal threaded portion of a pipe body. More particularly, the invention relates to a device which is arranged to apply a lubricant to the internal threaded portion, the device comprising an applicator body which is connected to a rotary device to allow rotation of the applicator body.

BACKGROUND

In petroleum recovery, a drill string is used for driving a drill bit which is drilling a hole or a well in the bedrock. The drill string is made up of various types of drill pipe. This is known in the art and will not be described in further detail. The drill pipes are provided with a threaded portion at either end. In a position of application, the upper threaded portion consists of a threaded female part, termed a box within the art. The lower threaded portion consists of a threaded male part, termed a pin end within the art.

A lubricating agent, termed dope within the art, is applied to the threaded portions. Dope is used to prevent wear on the threaded portions in connection with making up and breaking out the pipe connections and protection against corrosion during storage. The make-up and break-out can be done with machines, so-called iron rough-necks. These may be remote-controlled and the make-up or break-out is done at great speed.

Pulling the drill string out is done by the driller running a hoisting winch in such a way that a block with an elevator comes down to the upper end portion of the drill string, projecting through a drilling floor. The elevator is closed around the drill string and holds the drill string. The driller runs the block up in a derrick with the entire drill string hanging on the elevator. When one or more drill-pipe lengths have been pulled up above the drilling floor, the drill string is locked on the drilling floor. At the same time, a pipe-handling system comes out, grips around the drill string and holds the drill string. The elevator is opened and the block is run down towards the drilling floor again. At the same time, the iron roughneck is brought out and it breaks out the threaded connection. The free drill pipe is lifted by the pipe-handling system so that the pin end comes out of the box. The drill pipe is withdrawn from the longitudinal axis of the drill string, also called the well centre, and is put down in a so-called "set-back" area which may include a finger board. The iron roughneck is run back and, again, everything is ready for the block to get the next drill pipe. The method is repeated until the entire drill string is out of the well and has been brought up to the drilling floor.

It is known that when the drill string is pulled out of the well and separated into the individual drill pipes, these will be unprotected and there may be residues of old dope on the threaded portions of the drill pipes. After the drill pipes have been separated, the drill pipes are placed in the finger board of the derrick. Since, as a rule, the box of the drill pipe projects 30-50 m above the deck when the drill pipe is placed in the finger board, the box will be exposed to the weather, and the drill pipe may corrode if new dope is not applied to the female part after separation.

When the drill pipes are pulled out of the well and placed in the finger board, they may still be wet inside with a medium that has been pumped through the drill string, or with a medium that is in the well. There will always be liquid in the well. The medium may be a drilling slurry or drilling fluid, so-called mud. When the drill string is being broken out, the remainders of this medium will run out of the drill pipe at the pin end and contaminate the threaded portion in the box at the top of the drill pipe projecting above the drilling floor.

The widely used way of applying dope to the threads of the drill pipe is to manually apply dope to the threads in the box by means of a brush or the like. This is done when the drill string is being pulled out, as the box projects up through the drilling floor. For safety reasons, access to the drilling floor has become more and more restricted. The method of running the drill string into the well and pulling the drill string out is remote-controlled. Today, in many jurisdictions, personnel are not allowed to be on a drilling floor until all the equipment is at rest. In consequence of this, dope is not applied manually to the threaded portion of the box as the drill pipes are separated.

There is no need to apply dope to the threaded portion of the pin end if dope is applied to the threaded portion of the box. However, the threaded portion of the pin end must be clean before the drill pipes are screwed together. Cleaning the pin end may be done after the drill pipe has been placed in the fingerboard, as the pin end is the lower part of the drill pipe and thereby accessible from deck level.

Solutions in which dope is applied to the pin end are known. This application does not take the state of the box into account. This is a considerable drawback for the connection formed between two drill pipes, where the connection is will be subjected to great strains. The make-up of two consecutive drill pipes in a drill string is carried out until a moment of force determined by the dimensions of the drill pipes and type of threads is achieved. A correct moment of force is achieved when the threads are clean and have had the correct amount of dope applied to them. Some of the moment of force will have to be used to overcome the resistance from contaminants in the threads, such as old, dried-up dope and mud.

The entire threaded portion of the box must have dope applied to it to avoid wear and an incorrect moment of force during make-up. Solutions for applying dope by spraying via nozzles that are run in and out of the box are known. Dope has a high viscosity and nozzles are therefore prone to clogging. Parts of the threaded portion may remain unlubricated if the nozzles clog up. Further, much time may be spent on cleaning the nozzles.

Patent document US2004/0049905 discloses an iron roughneck including an apparatus for cleaning and applying dope to the threaded portion of the drill pipe. It appears from paragraph [0042], page 4, that the lubricating of the threads is carried out by spraying dope from a nozzle.

Patent document WO 2007/037698 discloses an apparatus for cleaning and applying dope to a threaded portion. It appears from claim 1, page 9, that the lubricating of the threads is carried out by spraying dope from at least one nozzle.

Patent document WO2015/041831 discloses an apparatus for lubricating the threaded portion of a drill pipe. It appears from paragraph [0026], page 9, that the lubrication of the threaded portion is carried out by placing a brush in contact with a rotating drill pipe.

Patent document WO9525216 discloses an apparatus for lubricating internal threads of drill pipes with a rotating brush. It appears from the first paragraph, page 4, that the brush is supplied with lubricant by the brush being lowered into a container for lubricant.

Patent document US2004/0140159 discloses an apparatus for lubricating internal threads in pipes by means of a centrifugal applicator. The apparatus includes a dosing system for regulating the amount of lubricating agent applied each time. The centrifugal applicator includes a container for lubricating agent, the container being connected to a motor and having a plurality of holes. The motor can rotate the container so that the lubricating agent is ejected from the holes and thus is applied to the threads in the pipe.

SUMMARY

The object of the invention is to remedy or reduce at least one of the drawbacks of the prior art or at least provide a useful alternative to the prior art.

The object is achieved through the features that are specified in the description below and in the claims that follow.

The invention is defined by the independent claims. The dependent claims define advantageous embodiments of the invention.

In a first aspect, the invention relates to a lubrication device for applying a lubricant from a lubricating-fluid reservoir to an internal threaded portion of a pipe body, the lubrication device comprising:
 a rotary device comprising:
  a first coupling part
  a second coupling part
  at least one through fluid passage for carrying the lubricant from an inlet on the first coupling part to an outlet on the second coupling part; the first coupling part and the second coupling part being arranged to rotate relative to each other around a rotational axis that, in use, coincides in the main with the longitudinal axis of the pipe body;
 an applicator body for applying the lubricant, the applicator body having an applicator surface, the applicator body being connected to the second coupling part of the rotary device to allow rotation around the rotational axis of the rotary device, and the applicator body having at least one through fluid passage with an outlet for carrying the fluid to the applicator surface as the at least one fluid passage of the applicator body is in fluid communication with a corresponding fluid passage in the rotary device.

The lubrication device according to the invention has an internal supply of lubricant and the possibility of rotating an applicator body. The fact that the applicator body may be rotated while, at the same time, being supplied with lubricant from the inside enables it to lubricate pipes that are at rest or are being rotated, and the amount of lubricant supplied to the applicator surface may be adjusted. This is made possible by using a rotary device with through fluid passages in fluid communication with corresponding through fluid passages in the applicator body. It should be noted that, in this embodiment, the rotary device and the applicator body are not restricted to having an equal number of fluid passages. In one embodiment, the rotary device may be a swivel.

By an applicator surface is meant, here, the outer surface of the applicator body.

Lubrication devices of a known type for lubricating external threads have brushes with through fluid passages for the supply of lubricant, but the brush are not rotatable then. The drill pipe must be rotated for the lubricant to be distributed on the threads. Other known types have rotating brushes for the lubrication of internal threads, but they do not have through fluid passages for the supply of a lubricant. One example is the brush being dipped in a reservoir of lubricant before the brush is inserted into the internal threaded portion and the lubricant being distributed by the brush being rotated. Thus, the amount of lubricant cannot be controlled.

The rotary device and the applicator body may have an equal number of fluid passages, wherein each fluid passage of the applicator body is in fluid communication with a corresponding fluid passage of the rotary device. An equal number of fluid passages in the rotary device and the applicator body are a practical embodiment as an unequal number of fluid passages will result in one or more of the fluid passages being unable to carry lubricant to the applicator surface.

The first coupling part and the second coupling part of the rotary device may, in the main, be cylindrical and installed coaxially. Two cylindrical coupling parts installed coaxially are a practical embodiment as it enables rotation of the two coupling parts around the same axis.

The rotary device and the applicator body may have at least two through fluid passages for increased supply of lubricant to the applicator surface. In one embodiment, the rotary device and the applicator body may have at least five through fluid passages for further increased supply of lubricant to the applicator surface. A plurality of fluid passages is practical as this may give a better distribution of the lubricant on the applicator surface. It may also provide for the supply of lubricant to the applicator surface not to stop if fewer than all of the fluid passages become clogged. In one embodiment the outlets of the fluid passages on the applicator body may be unequally spaced apart to achieve good distribution of lubricant on the applicator surface. In one embodiment, the applicator body may have a conical shape to facilitate insertion into the pipe body. In one application, the lubrication device may distribute lubricant onto an internal threaded portion of the box of a drill pipe. A conically shaped applicator body will be practical for such an application, as a standard drill pipe usually has a box with a conical shape internally. A conical shape may further ensure contact between the entire applicator surface and the entire internal threaded portion. In one embodiment, the applicator body may have a diameter which is somewhat larger than the internal diameter of the box for good contact with the internal threads and good distribution of lubricant on the internal threads.

In one embodiment, the applicator body may be a brush. A brush may provide good distribution of lubricant on the threaded portion. In another embodiment, the applicator body may be a rubber block or a sponge, for example.

The brush may comprise a top part, and at least one of the outlets of the brush may be placed on the bottom side of the top part for lubricant to be applied to the edge of the pipe body. In one embodiment, this may comprise applying lubricant to the edge of the box of a drill pipe. Lubricating the edge of the box may give less friction when separating the female part and the male part of the drill pipe.

The lubrication device may be provided with a motor for rotating the applicator body. In one embodiment, the motor may be directly connected to the through coupling part of the rotary device, on an opposite side to the applicator body. The motor may, for example, be a hydraulic, an electric or a pneumatic motor.

In a second aspect, the invention relates to a lubrication system including the lubrication device according to the first aspect of the invention, the system possibly including a bracket, wherein the lubrication device may be arranged on the bracket. Arranging the lubrication device on a bracket simplifies the insertion of the applicator body into the pipe body.

The bracket may be displaceably arranged on an arm. The arm makes it possible for the lubrication device to be moved to the pipe body if this is not directly below the applicator body. The bracket may be displaceable to reduce the risk of damage to equipment if a vertical force is exerted on the applicator body. This may happen, for example, if the applicator body strikes against the pipe body when the applicator body is being inserted. In one embodiment, the bracket may be provided with a coupling for quick detachment of the lubrication device from the bracket. In one embodiment, the coupling may comprise suspension hooks at the upper end portion of the bracket, which may interact with a suspension pipe on the arm and a locking bolt at the lower end portion of the bracket. Removal of the locking bolt makes it possible for the bracket to be lifted, in the main vertically, off the suspension pipe. This may be advantageous when, for example, there is a need for maintenance or replacement of parts of the lubrication device.

The system may further include at least one spring arranged on the arm to dampen a displacement of the bracket relative to the arm.

The system may be provided with at least one sensor for registering a relevant position of the applicator body relative to the pipe body. In one embodiment, a sensor may register the vertical position of the applicator body relative to the bottom of the box of a drill pipe. In another embodiment, a sensor may register the horizontal position of the applicator body relative to the longitudinal axis of a drill pipe. In a third embodiment, a sensor may register compression in at least one of the springs on the arm. Compression of the spring may suggest that the applicator body is hitting the bottom of the box of a drill pipe, which, in turn, may mean that the system is ready to apply lubricant to the internal threaded portion. The sensor may further output a signal to stop the movement of the actuator to avoid overload on and damage to equipment. The displaceable coupling between the bracket and the arm can give the system time to react on a signal from the sensor before any damage is caused to equipment.

At least one actuator may be arranged to displace the arm in mainly horizontal and in mainly vertical directions. An actuator may, for example, be hydraulic, pneumatic, electric or a screw jack. A hydraulic actuator may, for example, be a hydraulic cylinder. A pneumatic actuator may, for example, be a tie-rod cylinder. An electric actuator may, for example, be an electric motor or a step motor.

A pump may be arranged to pump lubricant from the lubricating-fluid reservoir to the applicator surface. A pump is a practical embodiment for moving the lubricant from the lubricating-fluid reservoir to the applicator surface.

The system may include a distributor for distributing a predefined amount of lubricant to each inlet on the rotary device. This may give control of how much lubricant is applied to the threaded portion. In one embodiment, the predefined amount of lubricant may be the same for each inlet. This may give even distribution of lubricant on the applicator surface. In one embodiment of the invention, the distributor may be replaced with several pumps, supplying one passage each with lubricant.

The lubrication system may include a rig, wherein the rig is arranged to house the arm, the at least one actuator, the at least one pump and the distributor. A rig may enable easy movement of the entire system in that this may be lifted or displaced as one unit. A rig may also protect the equipment that is arranged on or in the rig from an external load.

The system may include a cleaning unit arranged to clean and dry the internal threaded portion. A clean threaded portion may give increased adhesion between lubricant and threads. In one embodiment, the cleaning unit may include at least one nozzle supplied with a cleaning fluid for flushing the internal threaded portion and at least one nozzle supplied with pressurized air for drying the internal threaded portion. The cleaning unit may be arranged on the bracket.

In a third aspect, the invention relates, more specifically, to a method for distributing a lubricant on an internal threaded portion of a pipe body by using the lubrication device according to the preceding aspects of the invention, the method including the following steps:
  a) supplying the applicator surface with the lubricant through the at least one fluid passage;
  b) positioning the applicator body in the internal threaded portion;
  c) rotating the applicator body to distribute the lubricant on the internal threaded portion.

The method, before step a), may include the step:
  d) supplying at least two fluid passages with a predefined amount of lubricant through the distributor.

The method, before step d), may include the step:
  e) cleaning the threaded portion with the cleaning unit.

The method, before step c), may further include the step:
  f) registering the position of the applicator body in the internal threaded portion by means of a sensor.

BRIEF DESCRIPTION OF THE DRAWINGS

In what follows, an example of a preferred embodiment is described, which is visualized in the accompanying drawings, in which.

DETAILED DESCRIPTION OF THE DRAWINGS

Figure 1:
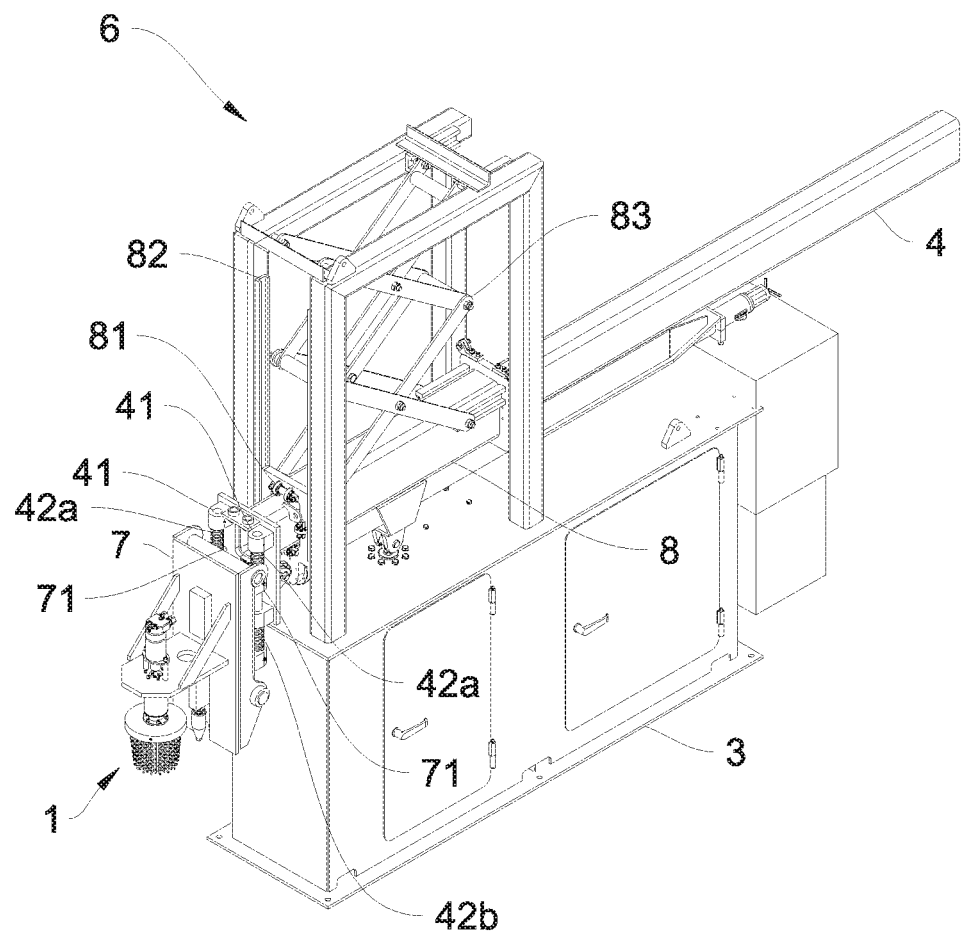
FIG. 1 shows a perspective view of an embodiment of the lubrication system according to the invention.

The figures are shown in a simplified manner, and details that are not important to elucidate what is new in the invention may have been omitted in the figures. The various elements in the figures are not necessarily shown to scale. In what follows, the reference numeral 1 indicates a lubrication device for distributing a lubricant on an internal threaded portion 21 of a pipe body 20, shown as the box 20 of a drill pipe in FIG. 5. In one embodiment, the lubrication device 1 may comprise a rig 3 which is anchored to a floor (not shown). The rig 3 is provided with two actuators 31, 32. These are shown as hydraulic cylinders 31, 32 in FIG. 2. The rig 3 houses an arm 4 which is attached to the hydraulic cylinders 31, 32 for horizontal displacement of the arm 4, mainly perpendicularly to the longitudinal axis 23 of the drill pipe 2, and for vertical displacement, mainly along the longitudinal axis 23 of the drill pipe 2. The cylinders 31, 32 may be remote-controlled from a control panel (not shown).

Figure 4:
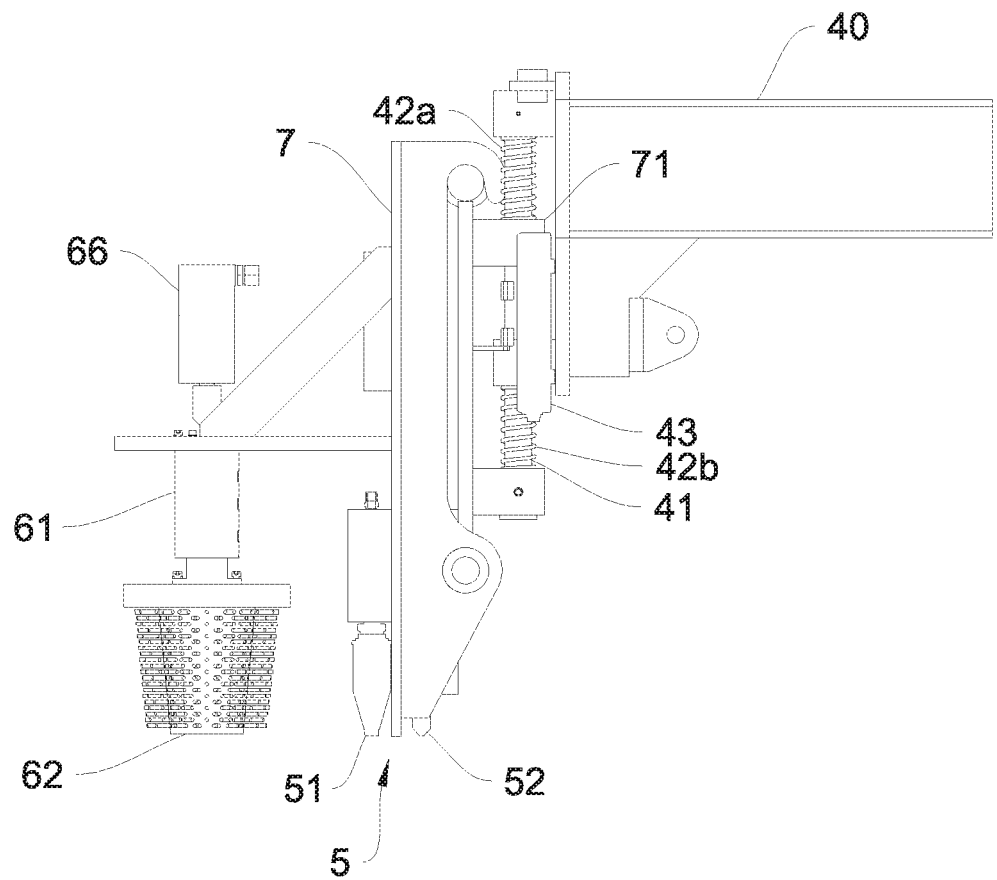
FIG. 4 shows the end portion of the arm and equipment arranged on it from the side.

Reference is now made to FIG. 4. The end portion 40 of the arm 4 is provided with two shafts 41, see FIG. 1. A bracket 7 is provided with two attachments 71, see FIG. 1, which are concentrically connected around the shafts 41 to allow displacement of the bracket 7 along the shafts 41. The shafts 41 are provided with four surrounding springs 42a, 42b in a position in which the attachment 71 of the bracket lies between an upper spring 42a and a lower spring 42b on each of the two shafts 41. The arm 4 is provided with a sensor 43 arranged to register a load on the springs 42a, 42b when the bracket 7 is being displaced along the shafts 41. The sensor 43 is further arranged to send signals to the cylinders 31, 32 to stop the displacement of the arm 4.

Reference is now made to FIGS. 3a-3d. A rotary device 61, shown here as a swivel 61, is attached to the bracket 7, see FIG. 4. The swivel 61 comprises two coaxial coupling parts 64, 65, the second coupling part 65 extending through the first coupling part 64. The swivel 61 further has five through fluid passages 611, each fluid passage 611 having an inlet 612 on the first coupling part 64 and an outlet 613 on the second coupling part 65. The two coupling parts 64, 65 are arranged in such a way that there is fluid communication between the inlet 612 and outlet 613 of each fluid passage 611. The lubricant can thereby be carried through the swivel 61 while the second coupling part 65 is simultaneously rotated relative to the first coupling part 64.

An applicator body, shown here as a brush 62, is attached to the second coupling part 65, at the same end as the outlets 613 of the fluid passages. The brush 62 is shown here with five through fluid passages 621. The connection between the brush 62 and the swivel 61 creates fluid communication between the corresponding fluid passages 621 in the brush and the swivel 611. Four of the outlets 622 on the brush 62 are spread over the brush surface 623 to give good distribution of lubricant. The fifth outlet 625 is placed in the bottom edge of the top part 624 of the brush 62, for lubrication of the edge 22 of the box 20 of the drill pipe. The brush 62 has a conical shape. The bristles 63 have a length such that the outer diameter of the brush is somewhat larger than the internal diameter of the box 20. The conical shape and the diameter of the brush ensure contact between the bristles 63 and the internal threaded portion 21 for good distribution of lubricant on the internal threaded portion 21.

Figure 2:
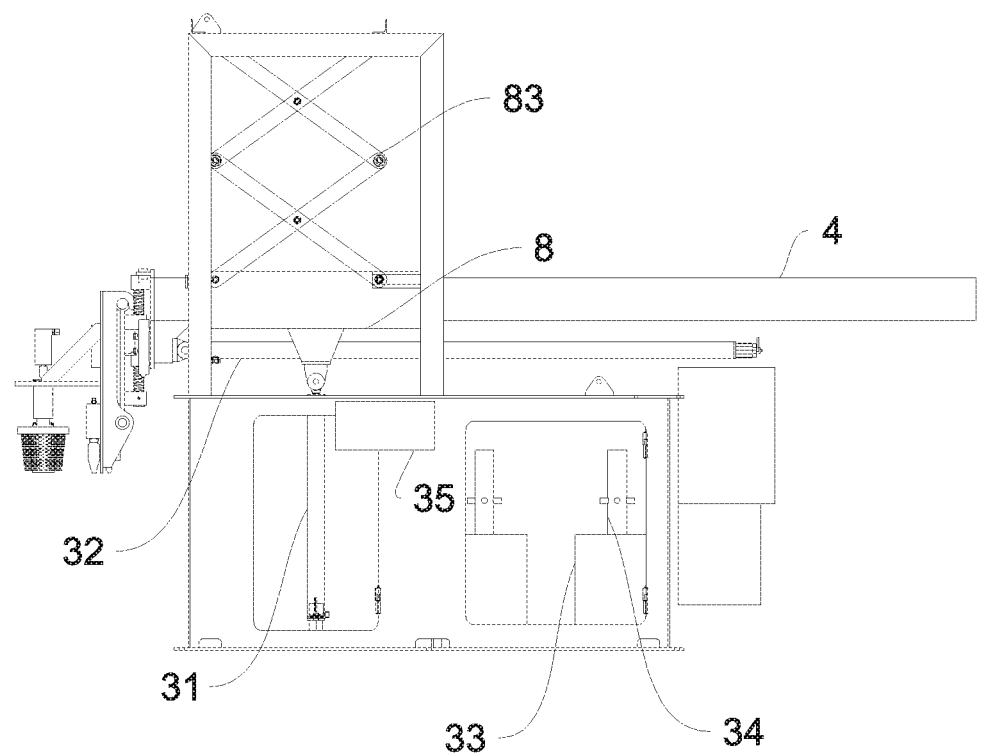
FIG. 2 shows the lubrication system from the side; the doors of the rig are open for the internal components to be illustrated.
Figure 5:
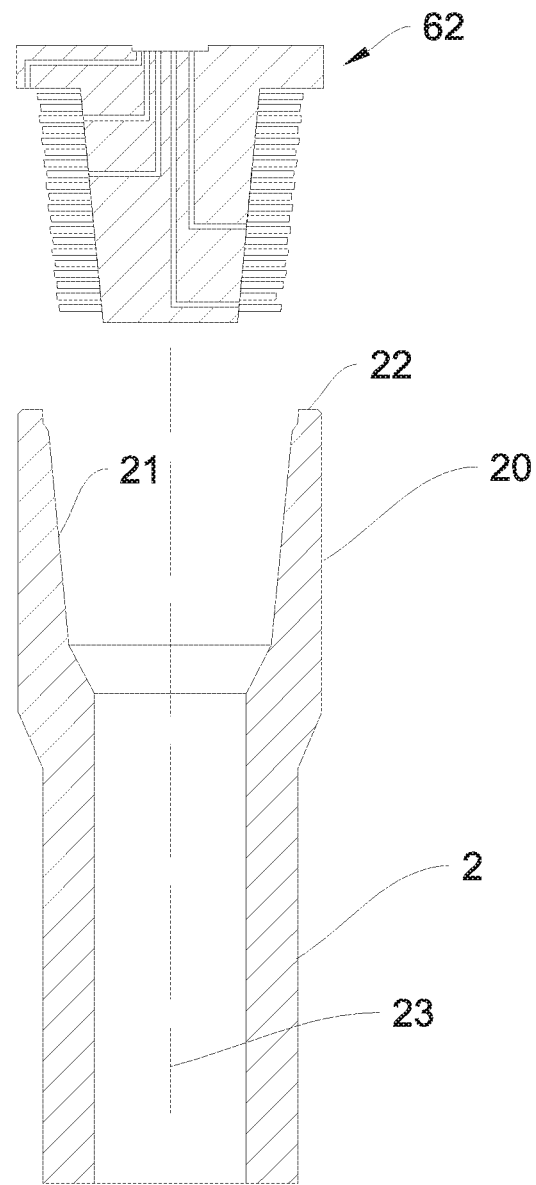
FIG. 5 shows a section of the applicator body positioned above a section of the box of a drill pipe.

The horizontal hydraulic cylinder 32, see FIG. 2, displaces the arm 4 to move the brush 62 in towards the centre of the box 20 at a height above the upper edge 22 of the box 20, see FIG. 5. The arm 4 is supported on a roller bearing 81 in a housing 8 for easy displacement, see FIG. 1. The vertical hydraulic cylinder 31, see FIG. 2, lowers the arm 4 to move the brush 62 into the box 20. In a vertical direction, the housing 8 is moved along a rail 82 connected to a scissor device 83 for easy displacement. As the brush 62 strikes against the bottom of the box 20, the bracket 7 will be displaced along the shafts 41, compressing the upper springs 42. The sensor 43 will register the compression of the springs 42, and at a predefined value (not defined), the sensor 43 will output a signal to stop the vertical displacement of the arm 4.

An applicator surface 623, shown here as a brush surface 623, is supplied with lubricant from a lubricating-fluid reservoir 33 and a pump 34. A distributor 35 distributes lubricant to fluid channels (not shown) which carry the lubricant to the inlets 612 on the swivel 61.

Figure 3:
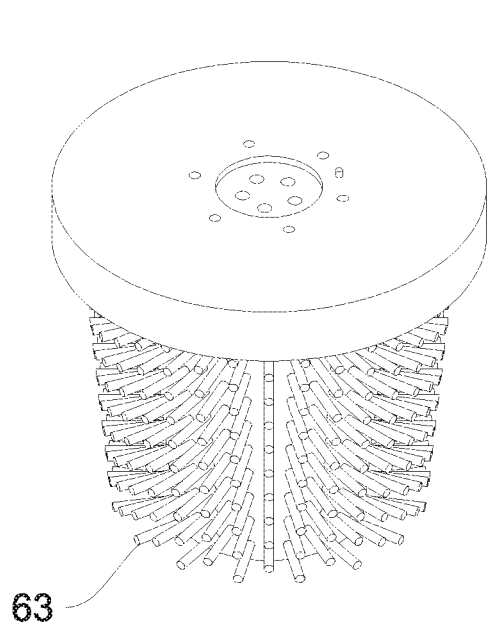
FIG. 3a shows a perspective view of an applicator body with a through fluid passage.
FIG. 3b shows a perspective view of a rotary device with a through fluid passage.
FIG. 3c shows a plan view of the end of a rotary device which is connected to the applicator body.
FIG. 3d shows a section through the applicator body shown in FIG. 3a and the rotary device shown in FIG. 3d connected to each other.
Figure 3:
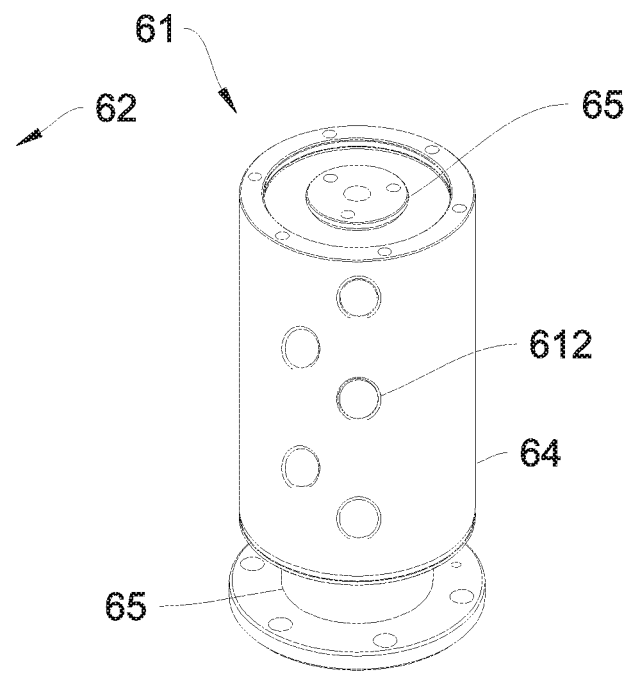
Figure 3:
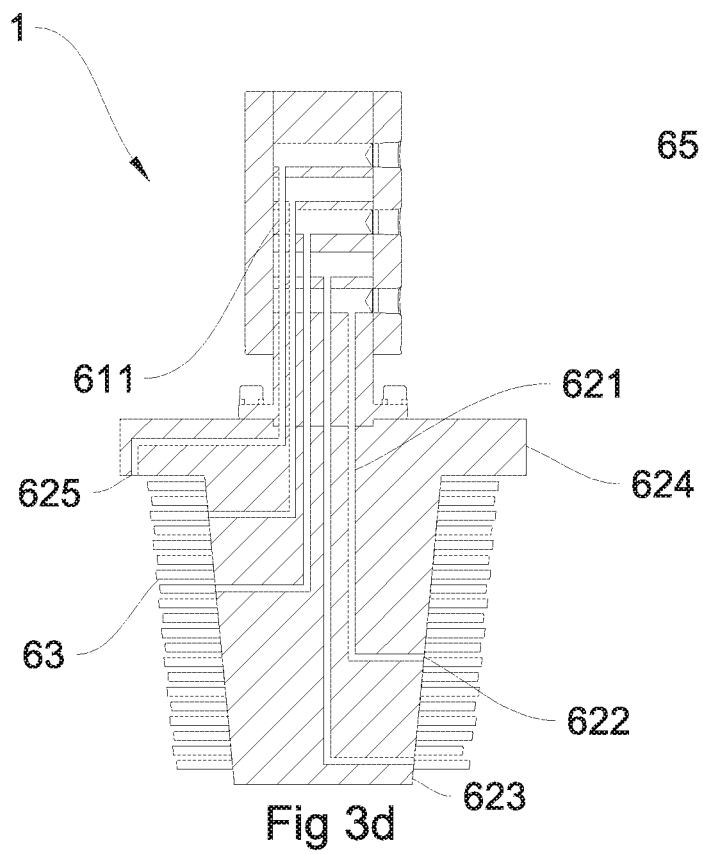

A motor 66, FIG. 4, shown here as a hydraulic motor 66, is attached to an opposite end of the second coupling part 65 relative to the brush 62, FIG. 3. The motor 66 can rotate the second coupling part 65 and thereby the brush 62. The motor is connected to a reservoir for hydraulic oil (not shown) and a control system (not shown). This will not be described in more detail as a person skilled in the art will know how a hydraulic motor works. The motor 66 may be remote-controlled from a control panel (not shown).

A cleaning unit 5, FIG. 4, consists of one flushing nozzle 51 and one drying nozzle 52 which are attached to the bracket 7. The flushing nozzle 51 is supplied with a cleaning liquid via channels from a preparation reservoir (not shown). The drying nozzle 52 is supplied with pressurized air (not shown). In use, the flushing nozzle 51 is inserted into the box 20 and flushes the internal threaded portion 21. Then the drying nozzle 52 is inserted into the box 20 and dries the internal threaded portion 21. When the threaded portion is clean, lubricant is applied as described earlier.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A lubrication device for applying a lubricant from a lubricating-fluid reservoir to an internal threaded portion of a pipe body, the lubrication device comprising:
   a rotary device which includes:
      a first cylindrical coupling part;
      a second cylindrical coupling part arranged within and coaxially with the first coupling part;
      at least two through fluid passages for carrying the lubricating fluid from at least two inlets on the first coupling part to at least two outlets on the second coupling part;
   the first coupling part and the second coupling part being arranged to rotate relative to each other around a rotational axis which, in use, coincides in the main with the longitudinal axis of the pipe body; and an applicator body for applying the lubricant, the applicator body having at least two through fluid passages, an applicator surface, and a top part, wherein:

the rotary device and the applicator body have an equal number of the at least two through fluid passages; and the top part of the applicator body is connected to the second coupling part of the rotary device to allow rotation around the rotational axis of the rotary device and to establish fluid connection between each of the at least two through fluid passages provided in the applicator body and one of the at least two outlets of a corresponding one of the at least two through fluid passages in the second coupling part of the rotary device, the at least two through fluid passages in the applicator body further having at least two outlets for carrying the lubricant to the applicator surface.

2. The lubrication device according to claim 1, wherein the lubrication device includes a motor for rotating the applicator body.

3. A lubrication system comprising the lubrication device according to claim 1, wherein the system comprises a bracket, the lubrication device being arranged on the bracket.

4. The lubrication system according to claim 3, wherein the system includes an arm, the bracket being displaceably arranged on the arm.

5. The lubrication system according to claim 4, wherein the system comprises at least one spring, the at least one spring being arranged on the arm to dampen a displacement of the bracket relative to the arm.

6. The lubrication system according to claim 5, wherein the system includes at least one sensor, the at least one sensor being arranged to register a relevant position of the applicator body relative to the pipe body.

7. The lubrication system according to claim 6, wherein the system includes at least one actuator, the at least one actuator being connected to the arm for displacement of the arm in a mainly horizontal direction and/or a mainly vertical direction.

8. The lubrication system according to claim 7, wherein the system includes at least one pump, the at least one pump being arranged to pump lubricant from the lubricating-fluid reservoir to the applicator surface.

9. The lubrication system according to claim 3, wherein the system includes a distributor, the distributor being arranged to distribute a predefined amount of lubricant to each fluid passage.

10. The lubrication system according to claim 9, wherein the system includes a rig, the rig being arranged to house the arm, the at least one actuator, the at least one pump and the distributor.

11. The lubrication system according to claim 10, wherein the system includes a cleaning unit, the cleaning unit being arranged to clean and dry the internal threaded portion of a pipe body.

12. The lubrication system according to claim 11, wherein the cleaning unit is arranged on the bracket.

13. A method for distributing a lubricant on an internal threaded portion of a pipe body by using a lubrication device comprising:

a rotary device which includes:
  a first cylindrical coupling part;
  a second cylindrical coupling part arranged within and coaxially with the first coupling part;
  at least two through fluid passages for carrying the lubricating fluid from at least two inlets on the first coupling part to at least two outlets on the second coupling part;
the first coupling part and the second coupling part being arranged to rotate relative to each other around a rotational axis which, in use, coincides in the main with the longitudinal axis of the pipe body; and
an applicator body for applying the lubricant, the applicator body having at least two through fluid passages, an applicator surface, and a top part, wherein:
the rotary device and the applicator body have an equal number of the at least two through fluid passages; and
the top part of the applicator body is connected to the second coupling part of the rotary device to allow rotation around the rotational axis of the rotary device and to establish fluid connection between each of the at least two through fluid passages provided in the applicator body and the at least two outlets of corresponding one of the at least two through fluid passages in the second coupling part of the rotary device, the at least two through fluid passages in the applicator body further having at least two outlets for carrying the lubricant to the applicator surface;
the method comprising the following steps:
  a. supplying the applicator surface with the lubricant;
  b. placing the applicator body in the pipe body;
  c. rotating the applicator body to distribute the lubricant on the threaded portion.

14. The lubrication device according to claim 1, wherein the at least two outlets of the at least two through fluid passages in the applicator body are at least three outlets of at least three through fluid passages in the applicator body, and wherein the at least three outlets are unequally spaced apart on the applicator surface.

15. The lubrication device according to claim 1, wherein the at least two through fluid passages in the rotary device extend parallel to each other between the at least two inlets and the at least two outlets.

16. The lubrication device according to claim 1, wherein at least one of the at least two through fluid passages in the rotary device extends non-coaxially with the rotational axis about which the second coupling part rotates relative to the first coupling part.

17. The lubrication device according to claim 1, wherein the at least two through fluid passages in the applicator body are arranged such that lubricant entering a first of the at least two inlets on the first coupling part remains separate from lubricant entering a second of the at least two outlets on the first coupling part while within the applicator body.

* * * * *